United States Patent [19]
Komori et al.

[11] Patent Number: 4,882,704
[45] Date of Patent: Nov. 21, 1989

[54] HAND-SHAKE TYPE DATA TRANSFER CONTROL CIRCUIT

[75] Inventors: Shinji Komori; Hidehiro Takata; Toshiyuki Tamura; Fumiyasu Asai, all of Itami, Japan

[73] Assignee: Mitsubishi Denki Kabushiki Kaisha, Japan

[21] Appl. No.: 157,194

[22] Filed: Feb. 17, 1988

[30] Foreign Application Priority Data

Feb. 18, 1987 [JP] Japan .................................. 62-36551

[51] Int. Cl.⁴ .............................................. G06F 1/00
[52] U.S. Cl. ..................................... 364/900; 364/940; 364/940.81
[58] Field of Search ........................ 364/200, 300, 900; 379/272; 340/826

[56] References Cited

U.S. PATENT DOCUMENTS

4,229,624 10/1980 Haben et al. .................... 379/272 X

OTHER PUBLICATIONS

"Introduction to VLSI Systems", by C. Mead and L. Conway; pp. 254-255, Addison Wesley Publishing Company.

Primary Examiner—Raulfe B. Zache
Attorney, Agent, or Firm—Townsend & Townsend

[57] ABSTRACT

A hand-shake type control circuit for controlling a data transfer circuit according to the status of a data transfer request signal. The data transfer request signal is initially received at a NAND gate and is also directly coupled to the reset input of are set flip-flop. The output of the NAND gate is used as a first control signal to set the flip-flop and to cause another circuit to activate data transfer. The flip-flop output is a second control signal which is reset only when the transfer request signal changes from an active to an inactive status. The second control signal is coupled to an input of the NAND gate and inactivates the first control signal. Thus, data transfer cannot recur until after the data transfer request signal changes to an inactive status so that parasitic oscillations are eliminated. The flip-flop consists of two, two input NAND gates that are located out of the path of data transfer and that are easier to fabricate than the prior art D flip-flop.

25 Claims, 13 Drawing Sheets

HAND-SHAKE TYPE DATA TRANSFER CONTROL CIRCUIT

BACKGROUND OF THE INVENTION

1. Field of the Invention

The present invention relates to a circuit used to control hand-shake type data transfer.

2. Description of the Prior Art

Handshaking between digital devices is the process of exchanging control signals such as receive, transfer, and timing information to accomplish synchronized data transfer. Handshaking is often used between control circuits for the stages in a pipelined microprocessor. In most handshaking systems, a data transfer circuit is controlled by a control circuit.

An example of a conventional data transfer circuit with an associated control circuit is shown in FIG. 1. FIG. 1 shows a specific arrangement of a handshake system using a one shot D flip-flop as found in the prior art.

Shown in FIG. 1 are latch circuits 42 and 43. Latch circuits 42 and 43 are controlled by the control circuits 13 and 14 shown in the lower half of the diagram. Latch circuits 42 and 43 transfer input data sequentially as output data.

As shown in FIG. 1, a one-shot pulse circuit 41 comprising a D flip-flop is coupled to the input of control circuit 13. When a high level write request pulse "PUSH" signal (a data transfer request signal) is received at the clock terminal CLK for flip-flop 41, a high level Send signal S1 (a data transfer request signal) is provided from terminal Q of flip-flop 41 to control circuit 13. Control circuit 13 subsequently causes the data latch circuit 42 to transfer data in response to S1. Control circuit 13 also outputs a send signal S2 to control circuit 14. Control circuit 14 causes the data latch circuit 43 to transfer data in response to input signal S2. Subsequently, control circuit 14 transmits a new send signal S3 to the next control circuit. Transfer and latching is sequentially continued in a similar fashion from one stage to the next in a typical pipelined microprocessor.

Timing for the above operations in the conventional prior art circuit of FIG. 1 is shown in the timing chart in FIG. 2.

The data transfer system shown in FIG. 1 uses an asynchronous FIFO memory. As previously mentioned, a one-shot pulse is generated using the D flip-flop 41. Flip flop 41 is provided to control the input pulse width for a predetermined time for the send signal S1 resulting from the data transfer request signal "PUSH". If D flip-flop 41 is omitted, the signal "PUSH" and the signal S1 become the same. As will be explained hereafter, in case the pulse width of the signal "PUSH" becomes too long, "parasitic oscillations" will be created, whereby data will be recurringly transferred two or more times as a result of only one "PUSH" signal.

The parasitic oscillation phenomenon can be explained by reference to FIG. 3 and FIG. 1.

FIG. 3 is a timing chart which graphically demonstrates how parasitic oscillation takes place for the circuit in FIG. 1 in which the D flip-flop is omitted. In this case, the signal "PUSH" is used directly as the send signal S1 to control circuit 13 and is coupled to an input to NAND gate 44 shown in FIG. 1. Upon receipt of the "PUSH" signal, NAND gate 44 generates an output acknowledge signal, $\overline{A1}$ and latching signal $\overline{L1}$ which are turned into 0. Signal A1 causes pulse signal S2 to be generated at the output of NAND gate 45 in circuit 13 of FIG. 1.

Signal $\overline{A2}$ from the succeeding stage 14 and signal IR from stage 13, which are both "0", are fed back to inputs to NAND gate 44. This causes output signal A1 to change back to "1". The change of $\overline{A1}$ back to 1 causes $\overline{A2}$ and IR to change back to "1". As can be seen from FIG. 3, if the active status of the "PUSH" signal extends for longer than a certain time (time t in FIG. 3), the signals $\overline{A2}$ and IR will have turned into "1" again. Therefore, the signal $\overline{A1}$ will be turned into "0" again, causing latch signal L1 to be generated two times with respect to one "PUSH" signal. As a result, the same data will be transferred twice to the succeeding latch circuit 43 by latch circuit 42.

This phenomenon is referred to as parasitic oscillation and cyclically repeats so long as the signal "PUSH" is being held at "1". Parasitic oscillation causes the same data to be transferred from the data latch circuit 42 on a recurring basis.

The problem of parasitic oscillation can be further appreciated by referring again to FIG. 1 which shows a send line S2 which is coupled between the output of NAND gate 45 and an input of NAND gate 47. Also shown is acknowledge line $\overline{A2}$ which is coupled between the output of NAND gate 47 and an input of NAND gate 44. If, in FIG. 1, the pulse width of the data request signal, which is transferred in sequences of S1, S2, and S3, is too long because of the length of the send lines and return acknowledge lines, parasitic oscillations similar to that mentioned above are generated. For example, employing the leading edge of the signal S2, the pulse width for S2 is determined by the following expression:

Pulse width S2=(Wiring delay of the Send line S2)+(Propagation delay of the NAND gate 47)+Wiring delay of Ack line $\overline{A2}$)+(Propagation delay of the NAND gates 44 or 46, whichever is longer)+(Propagation delay of the NAND gate 45)

Therefore, if the wiring lengths of the send line S2 and the acknowledge line $\overline{A2}$ become too long, the delay time increases. The pulse widths of the data transfer signals S1, S2, and S3 cannot exceed the above-described pulse widths or parasitic oscillations will be generated.

In an attempt to restrict such parasitics oscillation and, more particularly, to limit the pulse width of the signal "PUSH" below a time duration so that no parasitic oscillation is generated, a one-shot pulse generation circuit which uses a D flip-flop is provided in a conventional circuit such as the one shown in FIG. 1.

However, problems remain even when a D flip-flop is used. As can be seen from the foregoing explanation, the D flip-flop circuit works properly only if the input pulse is kept below a certain width. Moreover, a conventional hand-shake system will have many stages so that the optimum pulse width may vary from stage to stage.

In addition, a conventional data transfer system faces other design problems when used in pipeline applications. For instance, a conventional FIFO memory as used in FIG. 1 typically uses a bipolar element having a large driving capacity. Sometimes, however, it is necessary due to design considerations, to use a MOS type element having a small driving capacity when high integration and low power consumption are intended. Moreover, in some cases, the data transfer control circuit as shown in FIG. 1 is to be used not solely to control data transfer. For example, the data transfer circuit may be useful in connection with logic circuits and the like for implementing data processing between latch circuits as shown in the pipeline system in FIG. 4. In most such instances, use of send and acknowledge lines is also desirable to provide a means for communication between processing stages. When configuring a pipeline system provided with multistage cascade connections, the wiring lengths of the send lines and acknowledge lines become long as the physical distance between stages become long. Since the wiring capacity increases proportionally to the wiring length, if the driving element is a MOS element, the delay time due to wiring cannot be ignored.

In addition, when a one-shot pulse circuit such as the D flip-flop is inserted into each stage, additional problems will be created, such as increase in the quantity of in-line hardware and reduction of the pulse transfer speed of the send signal. Furthermore, a D flip-flop circuit includes numerous logic gates and inverters and requires multiple data, clock, and other input signals as is well known in the art. Thus, to actually manufacture a D flip-flop for inclusion in a handshake circuit requires relatively complicated fabrication steps with a disadvantageous increase in costs.

SUMMARY OF THE INVENTION

The invention is accomplished in view of the problems stated above, and its primary object is to provide a hand-shake type data transfer control circuit capable of eliminating parasitic oscillation while permitting high speed data transfer. Still another object of the invention is to eliminate parasitic oscillations while maintaining a hand-shake system configuration which includes acknowledge and send lines.

A further object of this invention is to provide a hand-shake type data transfer control circuit which can achieve the above objects and yet is capable of maintaining high speed transfer of data request signals by avoiding a substantial increase in in-line hardware.

Still another object of the invention is to provide a control circuit which is relatively easy to fabricate. Still another object of the invention is to provide a control circuit which can cope with varying delays from stage to stage in a multistage hand-shake system.

According to the invention there is provided a hand-shake type control circuit for controlling a data transfer circuit according to the status of a data transfer request signal. The data transfer request signal is initially received at a NAND gate and is also directly coupled to the reset input of a reset set flip-flop. The output of the NAND gate is used as a first control signal to set the flip-flop and to cause another circuit to activate data transfer. The flip-flop output is a second control signal which is reset only when the transfer request signal changes from an active to an inactive status. The second control signal is coupled to an input of the NAND gate and inactivates the first control signal. Thus, data transfer cannot recur until after the data transfer request signal changes to an inactive status so that parasitic oscillations are eliminated. The flip-flop consists of two, two input NAND gates that are located out of the path of data transfer and that are easier to fabricate than the prior art D flip-flop.

The above and further objects and features of the invention will be more fully apparent from the following detailed description with accompanying drawings.

DESCRIPTION OF THE PREFERRED EMBODIMENTS

The invention will hereafter be described in detail with reference to the drawings which show embodiments of the invention and timing charts for various embodiments.

Figure 5:
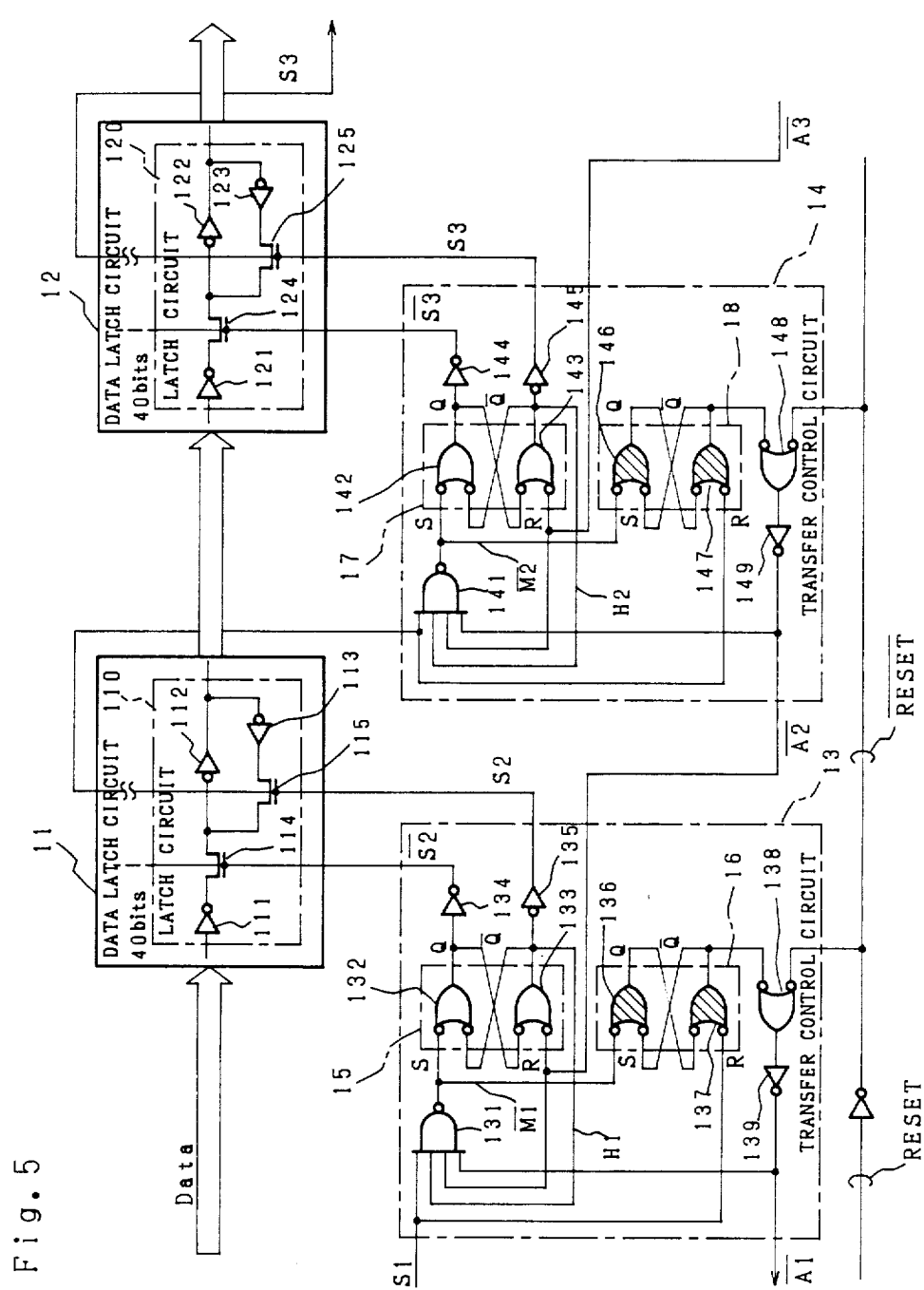
FIG. 5 is a detailed circuit diagram showing the preferred embodiment of the invention.
Figure 5A:
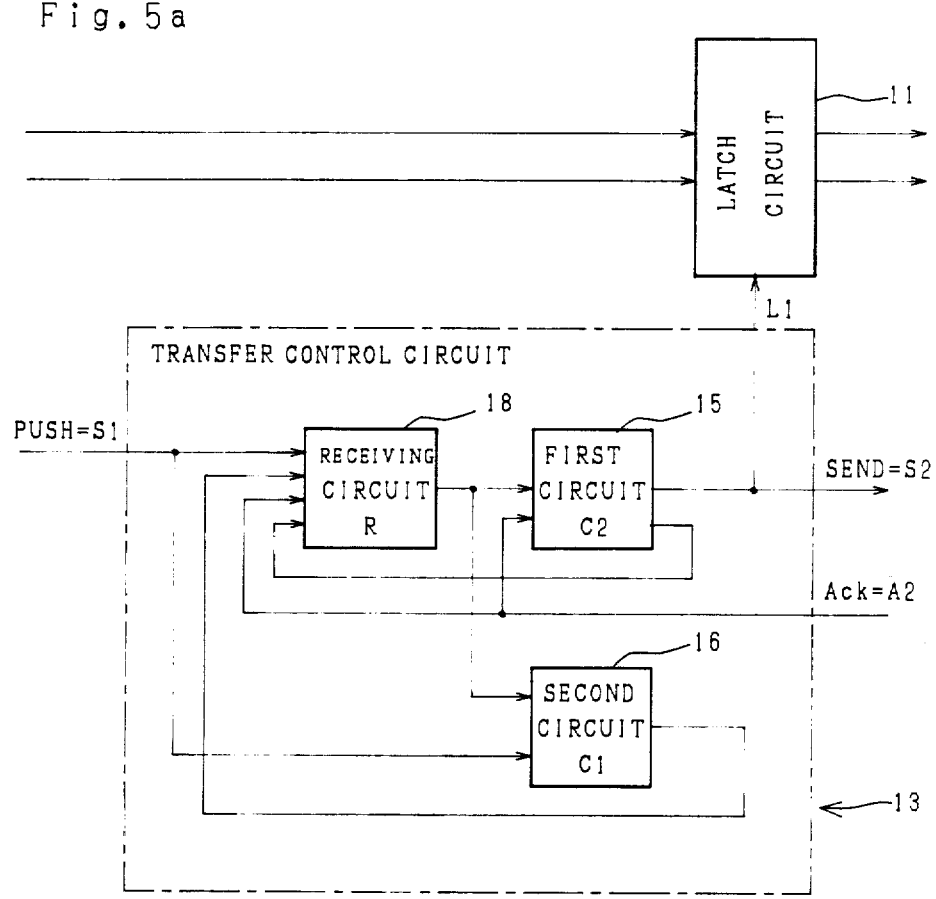
FIG. 5a is a block diagram of another embodiment of the invention.

FIG. 5a is a block diagram of one generalized embodiment of the invention showing a circuit 18 for receiving a data transfer request signal to generate a first control signal. Also shown is a first circuit 15 for activating data transfer in response to the first control signal. Also shown is a second circuit 16 for generating a second control signal indicating the status of said data request signal.

Receiving circuit 18 causes circuit 15 to activate data transfer circuit 11 depending on predetermined combinations of the following signals: the push signal (data request signal), the second control signal from circuit 16, and an acknowledge signal from the next stage. Receiving circuit 18 may also be configured to be responsive to an output signal from circuit 15.

FIG. 5 is a detailed logic diagram showing a data transfer control circuit according to the preferred embodiment of the invention and the detailed configuration of a latch type data transfer circuit which is controlled by the data transfer control circuit of the invention.

Referring now to FIG. 5, circuits 11 and 12 are data latch circuits of 40 bits respectively, although clearly latch circuits of different bit size may be used. Specifically shown are latch circuits 110 and 120, which are each one bit circuits. Latch circuits 110 and 120 include respectively inverter buffers 111, 112, 113 for circuit 110, and 121, 122, and 123 for circuit 120. Also included are transfer gates 114, 115 for circuit 110 and 124 and 125 for circuit 120.

Also shown in FIG. 5 are transfer control circuits 13 and 14 for the above data latch circuits 11 and 12, respectively. Control circuit 13 will be discussed hereafter but it should be understood that the structure and operation of circuit 14 is substantially identical. Control circuit 13 is configured with R-S flip-flop 15 as a first memory means and R-S flip-flop 16 as a second memory means. Control circuit 13 also includes an input NAND gate 131 which has 4 inputs and serves as a data transfer request signal receiving means. Circuit 13 also includes inverter buffers 134, 135, 139 and NAND gate 138 which has 2 inputs.

The first R-S flip-flop 15 is configured with two NAND gates 132 and 133, each having 2 inputs. The second R-S flip-flop 16 is configured with two NAND gates 136 and 137, each having 2 inputs.

Referring still to FIG. 5, it can be seen that the components of circuit 13 are coupled together as follows. One input of the NAND gate 131, which has 4 inputs, is pulse S1, the send signal (input data transfer request signal or request signal from the previous stage). The output of NAND gate 131 is a first control signal and is connected to the set terminal S of the first R-S flip-flop 15. The reset terminal of flip-flop 15 is provided with the acknowledge signal $\overline{A2}$ from the control circuit of the next stage. Acknowledge signal $\overline{A2}$ is also coupled to one input of the NAND gate 131.

Referring still to FIG. 5, the signal from the output terminal Q of the first R-S flip-flop 15 is coupled to the transfer gate 114 of the data latch circuit 11 as the inversion signal $\overline{S2}$ of the send signal pulse S2 through inverter buffer 134. The signal from the inversion output terminal of the first flip-flop 15 is coupled as the send signal pulse S2 through the inverter buffer 135 and to the transfer gate 115 of the data latch circuit 11. S2 is also coupled directly to the input of the NAND gate 141 of the next stage.

The send signal pulse S1 is also coupled to the reset terminal R of the second R-S flip-flop 16. The output of NAND gate 131 is coupled to the set terminal S of the second R-S flip-flop 16. Also, the output from the inversion output terminal Q of the second R-S flip-flop 16 is used as a second control signal and is coupled to one input of NAND gate 138. NAND gate 138 is also fed the signal $\overline{RESET}$ as its other input. The output of NAND gate 138 is fed back to the previous stage through the inverter buffer 139 as acknowledge signal $\overline{A1}$. The output of inverter buffer 139 is also made the final input of NAND gate 131.

It should be apparent that a plurality of data latch circuits 11 and control circuits 13 according to the invention may be combined and connected for use with more than two cascaded stages in a pipelined processing system.

Although the interactive operation of control circuit 13 and latch circuit 11 will now be explained, it should be appreciated that the operation of succeeding latch and control circuits in a pipelined system is basically the same.

Figure 6:
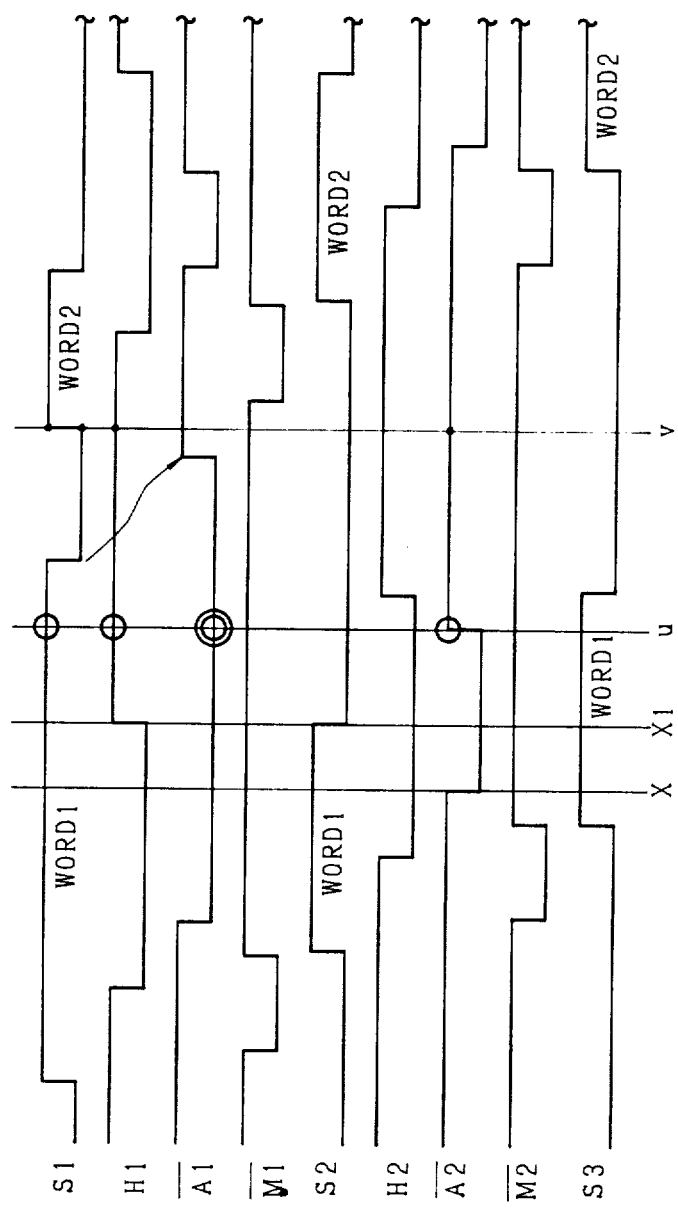
FIG. 6 is the timing chart of the logic diagram shown in FIG. 5.

FIG. 6 is a timing chart which illustrates the sequential operation of control circuit 13 and is helpful to an understanding thereof.

Referring now to FIG. 5 and FIG. 6, under initial conditions, signal lines are directly initialized when the reset signal "RESET" is turned into "1". After initialization, all inputs to NAND gate 131 are "1" except for the PUSH signal which is "0" in its initially inactive status.

When the send signal pulse S1 is received at an input to NAND gate 131 in an active status, all the inputs of NAND gate 131 will then become "1". All of its inputs now being "1", the output of NAND gate 131 becomes "0" to generate the first control signal (inverse M1). The first control signal is coupled to the set inputs of flip-flops 15 and 16 to cause changes in the outputs of flip-flops 15 and 16. As a result, at the output of flip-flop 15, the send signal S2 is changed to "1" and the inversion output of S2 is changed to "0". The data latch circuit 11, which is the control object of the data transfer control circuit 13, is caused to be latched, thereby activating data transfer. Simultaneously, the data transfer request signal for the succeeding stage, send signal S2, is transferred to data transfer control circuit 14 of the next stage in the active status "1" whereby all 4 inputs of the NAND gate 141 in the next stage become "1". As a result, both flip-flop 17 and flip-flop 18 are set and the inversion acknowledge signal $\overline{A2}$ from the succeeding stage is changed to the active status "0".

Referring still to FIGS. 5 and 6, when acknowledge signal $\overline{A2}$ is changed to the active status "0", flip-flop 15 of the data transfer circuit 13 is reset which causes send signal S2 and the output of flip-flop 15 to be changed to non-active status "0".

At this point, flip-flop 16 still keeps the set status if the send signal S1 is still in the active status "1". Therefore, the output of the inverter 139 is "0" and all of the four inputs of NAND gate 131 cannot become "1". Therefore, flip-flop 15 will not be set again and thus there will be no extra send signal S2 generated. Thus, a new S2 pulse for causing another cycle of latching and activation of the next control circuit cannot be generated even though the first S1 pulse remains active.

When the send signal S1 is subsequently changed to non-active status "0", flip-flop 16 is reset at the same time, causing the output of the inverter 139 to change to "1". The output of inverter 139 will not return to "0" until flip-flop 16 is set by a return of the data transfer request signal to the active status. Since control circuit 13 is disabled from generating a new send signal S2 or a new latch signal when the status of data transfer request signal S1 goes inactive, control circuit 13 remains inactive until a new request pulse is received. Once the send signal S1 is again changed to a new active status, all the inputs of the NAND gate 131 will become "1", flip-flops 15 and 16 will be set again, and a new data transfer cycle will be generated.

FIG. 6 is a timing chart illustrating the series of operations of above.

In FIG. 6, at time "X", $\overline{A2}$ changes, and thereafter at "X1", S2 goes inactive.

In FIG. 6 at a time "u", H1 and $\overline{A2}$ are returned to "1" among the inputs S1, H1, $\overline{A1}$, and $\overline{A2}$ of the NAND gate 131, but $\overline{A1}$ still maintains "0" and will remain "0" until pulse S1 goes to "0". In view of the foregoing, it can be understood that the generation of parasitic oscillation is virtually eliminated by the circuit of FIG. 5.

Referring still to FIG. 6, it can be seen that the signal $\overline{A1}$ is returned to "1" in response to the change of the send signal S1 to non-active status "0". Therefore, at time v when a new send signal S1 for word 2 is received, all the inputs S1, H1, $\overline{A1}$ and $\overline{A2}$ of the NAND gate 131 are "1" causing a normal pulse signal for the word 2 to be generated. As can be seen from the above explanation, parasitic oscillation has been virtually eliminated with less delay in the transfer of signals and latching of data down the pipeline as compared to the prior art embodiment of FIG. 1.

Figure 7:
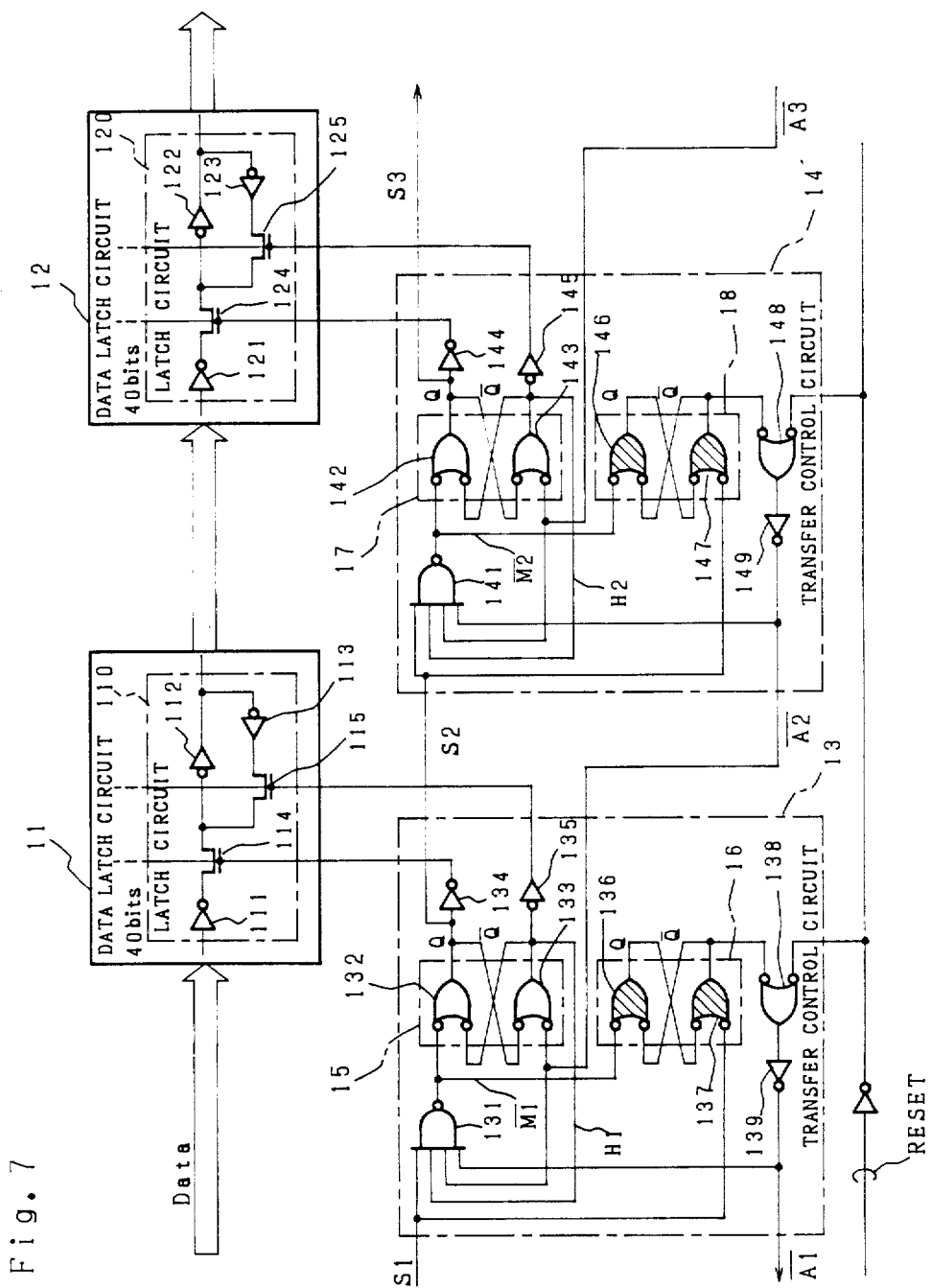
FIGS. 7, 7a through FIG. 10 and FIG. 12 are logic diagrams respectively showing other embodiments of the invention.

To reduce the time delay between the propagation of the data transfer request signal and the data transfer, the invention has been configured to accomplish more rapid data transfer by directly transferring the send signal (S2 for example) for the next stage according to the embodiments in FIG. 5a and in FIG. 7.

Refer now to the embodiment of the invention shown in FIG. 7. If the time delay between the propagation of the send signal and data transfer is within an allowable range, it is not always necessary to adopt the configuration shown in FIG. 5a or FIGS. 7. The logic circuit shown in FIG. 7 performs an equivalent operation. The send signal S2 of the configuration shown in FIG. 7 is logically equivalent to the send signal S2 from the output of the inverter buffer 135 shown in FIG. 5; however, S2 is taken directly from the Q output of flipflop 15 in FIG. 7. Utilizing this configuration, the send signal S2 for the next stage is obtained directly from the output of the NAND gate 132, avoiding the delay from the intervening buffer.

Figure 7A:
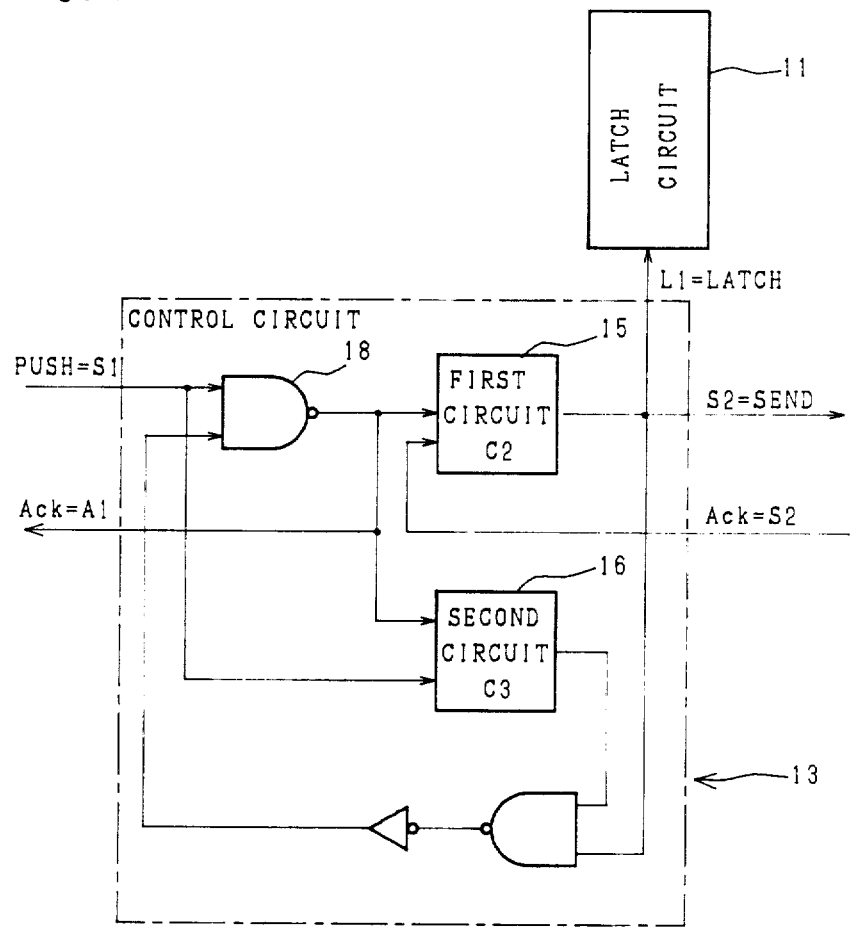

In some data transfer applications, the embodiment in FIG. 7a may be utilized to minimize the variety of required circuits. In FIG. 7a, the receiving circuit is a two input NAND gate having the PUSH signal as one input and the control signal output of circuit 16 as the second input. Circuits 15 and 16 may consist solely of two input NAND gates as well so that control circuit 13 may be fabricated using essentially only two input NAND gates.

Figure 1:
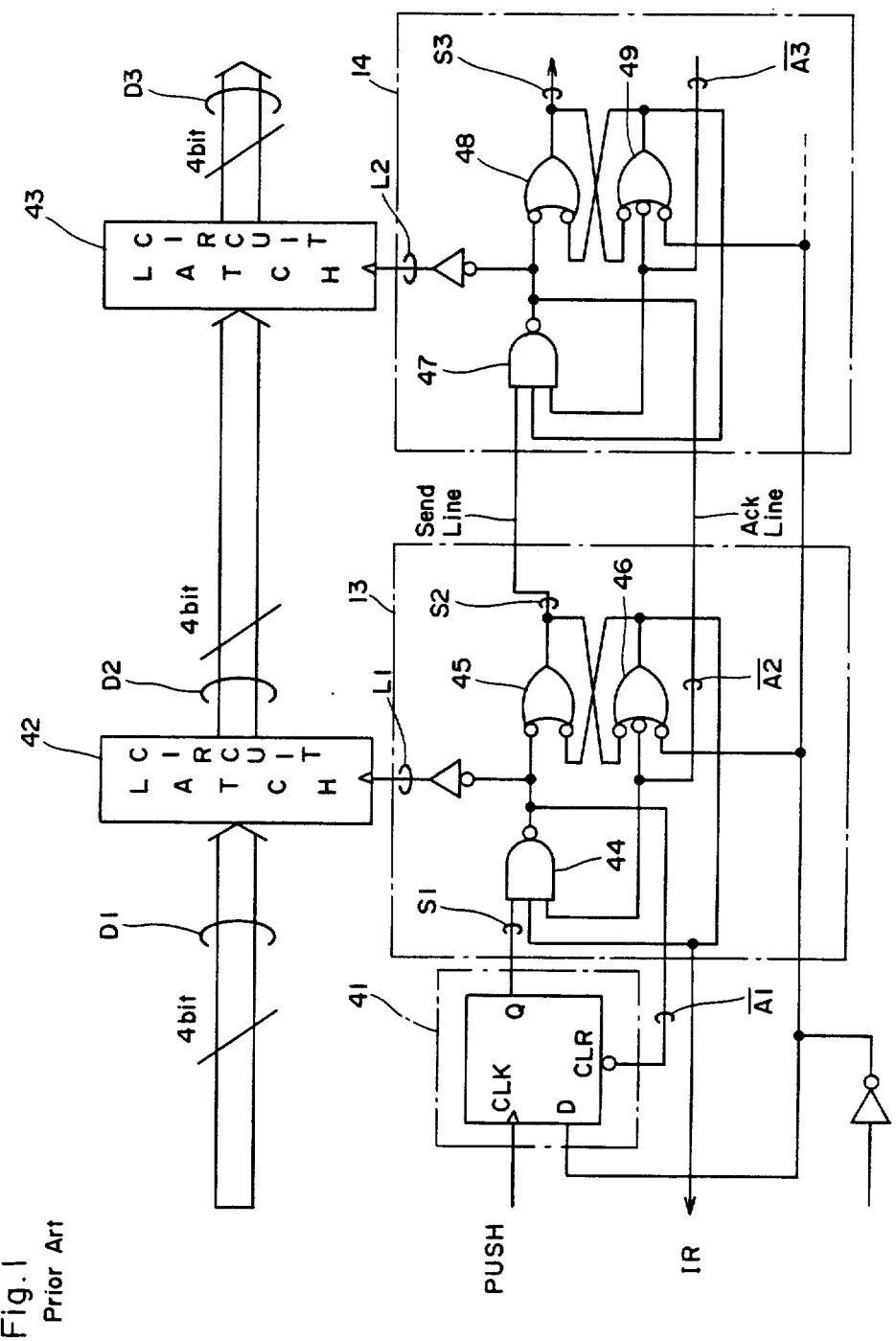
FIG. 1 is a detailed logic diagram showing a conventional configuration using one D flip-flop, as previously discussed.
Figure 2:
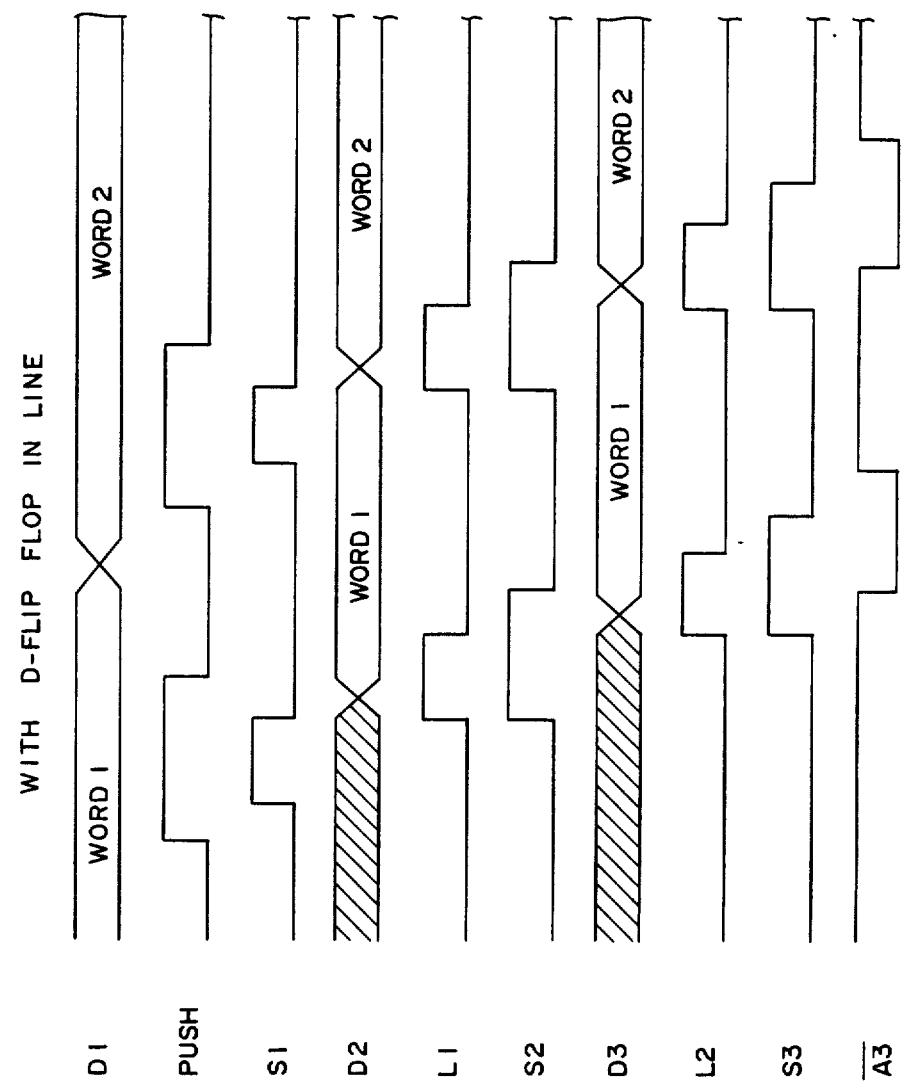
FIG. 2 is a timing chart for the conventional circuit employing a D flip-flop as shown in FIG. 1.
Figure 3:
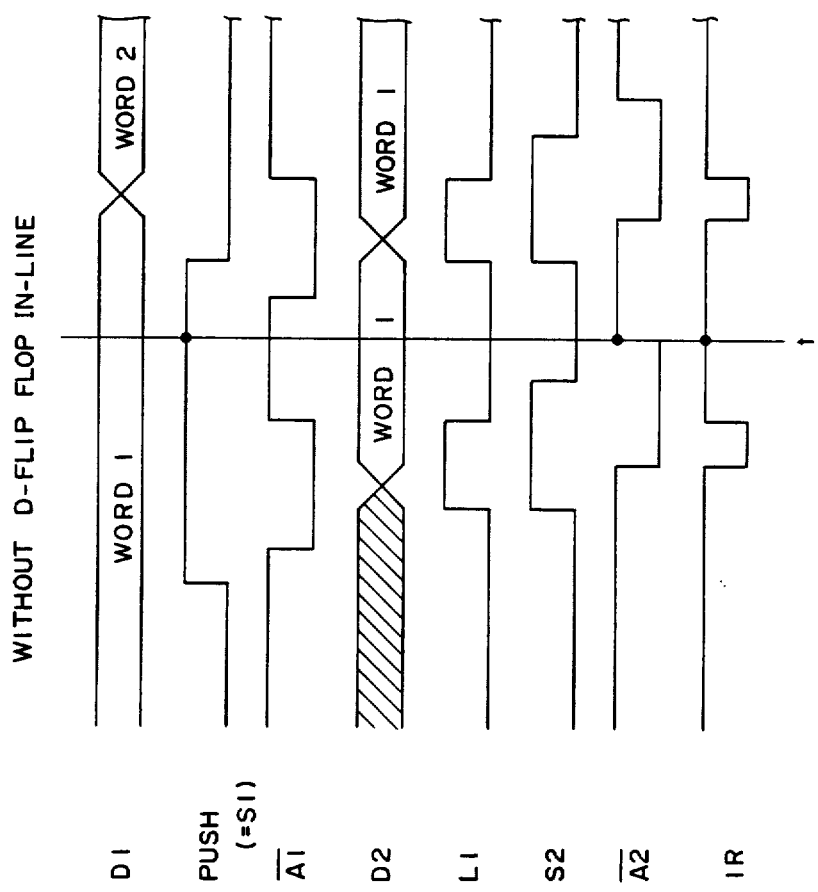
FIG. 3 is a timing chart for the data transfer system shown in FIG. 1 with the pulse control flip-flop omitted.

In the configuration shown in FIG. 7, the delay time per stage of the send signal becomes the delay of 2 logic gates, and it becomes possible to accomplish high speed data transfer which is by no means inferior to the conventional example shown in FIG. 1 while maintaining desired control over data transfer.

Figure 8:
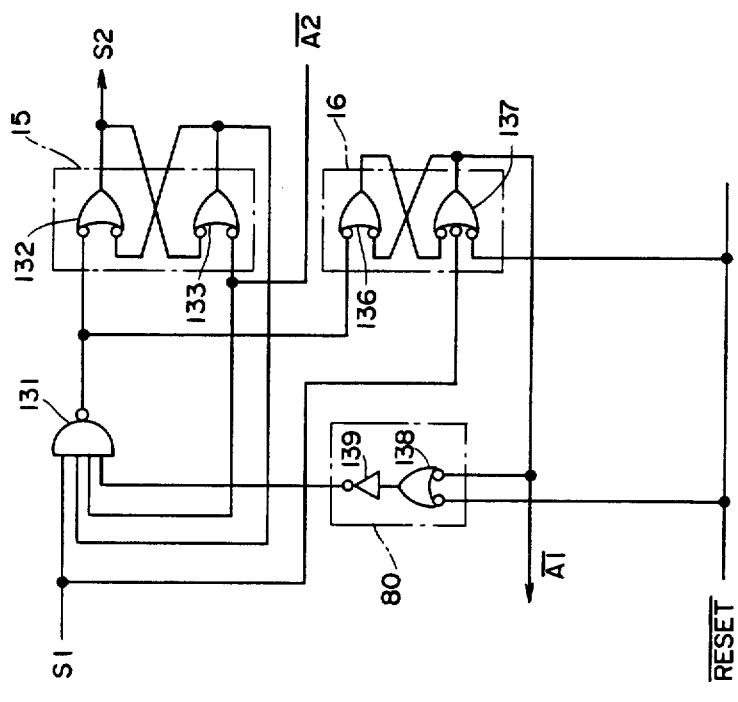

Refer now to FIG. 8. The NAND gate 138 and the inverter 139, which are elements used to reset the two flip-flops 15 and 16 shown in FIGS. 5 and 7, are removed from the feedback path for the acknowledge signal $\overline{A1}$ (and similarly for $\overline{A2}$ in the next stage). By placing NAND gate 138 and inverter 139 at the position shown by reference numeral 80 in FIG. 8, it becomes possible to further reduce the minimum word input interval, which is determined by the propagation speed of the send signal and the return acknowledge signal. As a result, high density data transfer is further enhanced.

Figure 9:
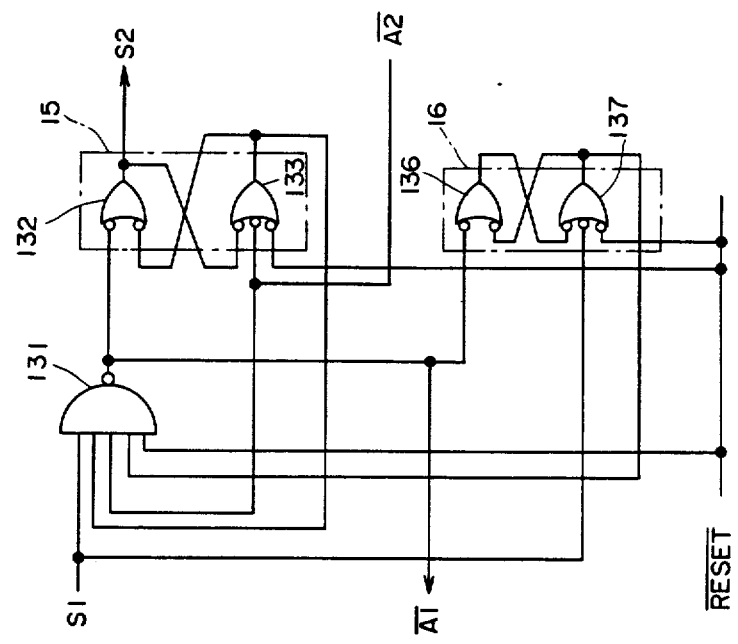

Furthermore, as shown in FIG. 9, if the output of the NAND gate 131 is used as an acknowledge signal $\overline{A1}$ which is coupled to the previous stage, the propagation route of the acknowledge signal can be reduced further, and extremely high density data transfer is facilitated.

Figure 10:
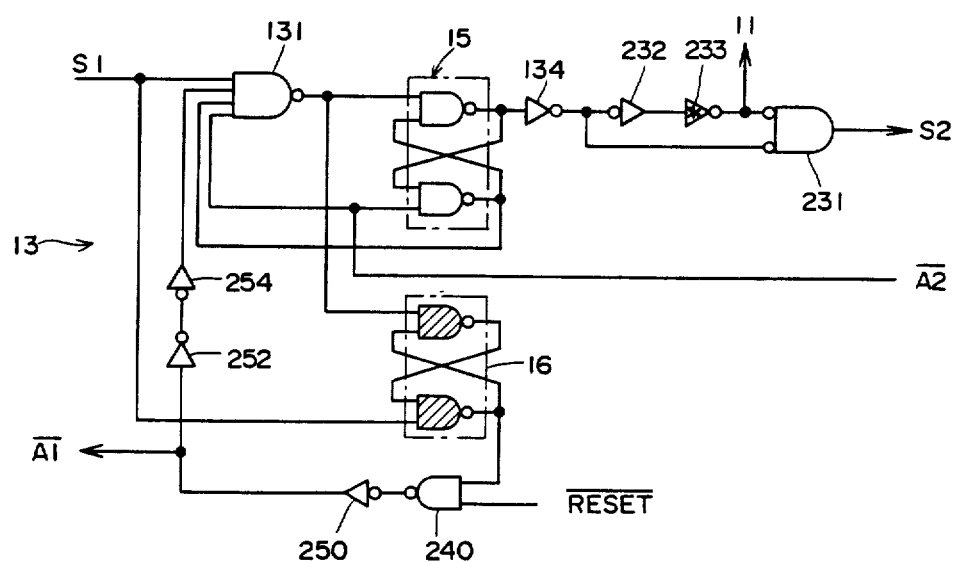
Figure 11:
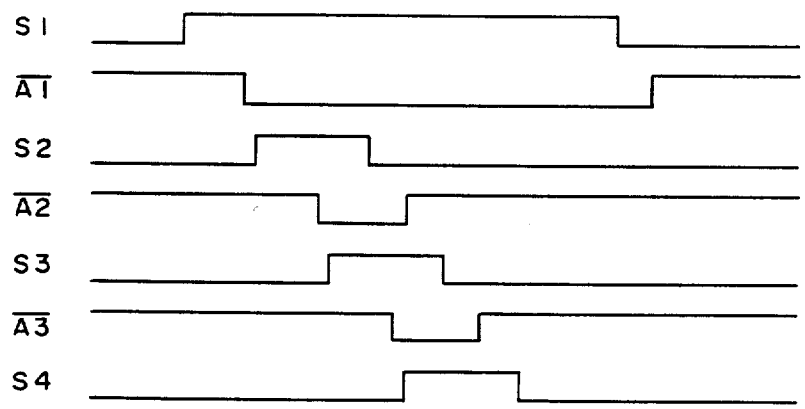
FIG. 11 and FIG. 13 are the timing charts of the embodiments shown in FIG. 10 and FIG. 12.

Refer now to FIG. 10, yet another embodiment of the invention. As shown in FIG. 10 in control circuit 13, the send signal S2 for the next stage is inverted at inverter 134, after being received from the output terminal Q of the first R-S flip-flop 15. The output of inverter 134 is coupled directly into one input of the NOR gate 231 and, through two inverter buffers 232, 233, into the other input of NOR gate 231. Using this configuration, the speed of trailing edge of the send signal pulse S2 is accelerated as shown in the timing chart of FIG. 11.

Figure 12:
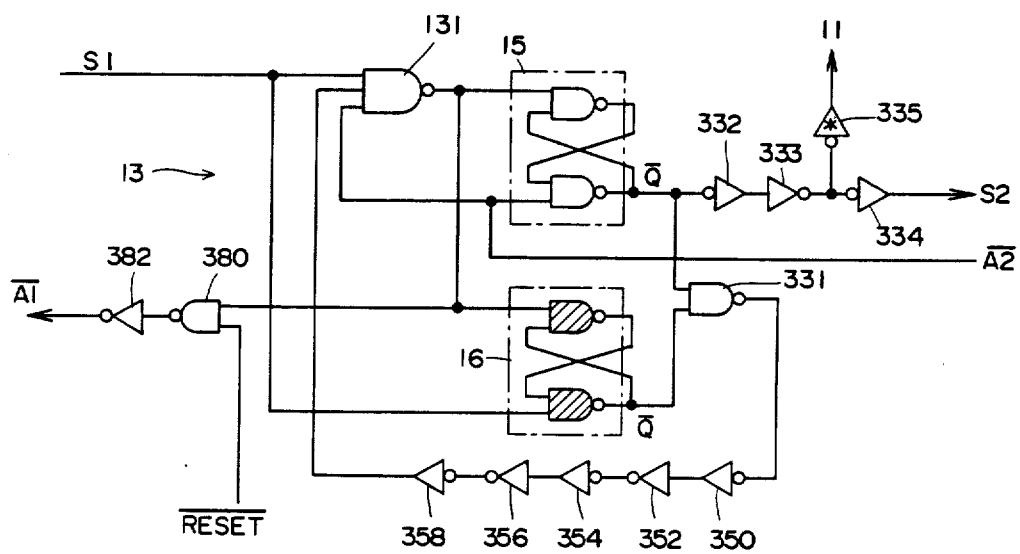
Figure 13:
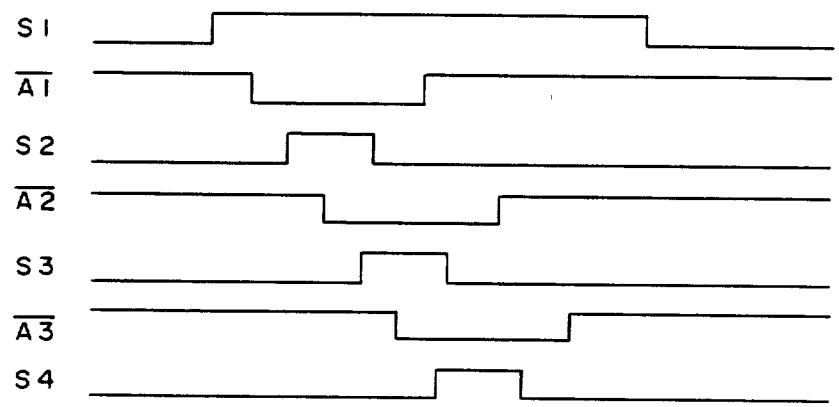

Refer now to FIG. 12. By coupling the inversion output terminals Q of both the first R-S flip-flop 15 and the second R-S flip-flop 16 in advance to two input NAND gate 331, it becomes possible to reduce the number of the input signals for NAND gate 131 to 3 inputs in control circuit 13. In addition, the output of NAND gate 131 in FIG. 12 is shown coupled directly to NAND gate 380, which in turn feeds inverter 139 to produce acknowledge signal $\overline{A1}$. As a result it becomes possible to further accelerate the propagation speed of the send signal through further reductions in the delay time.

Figure 14:
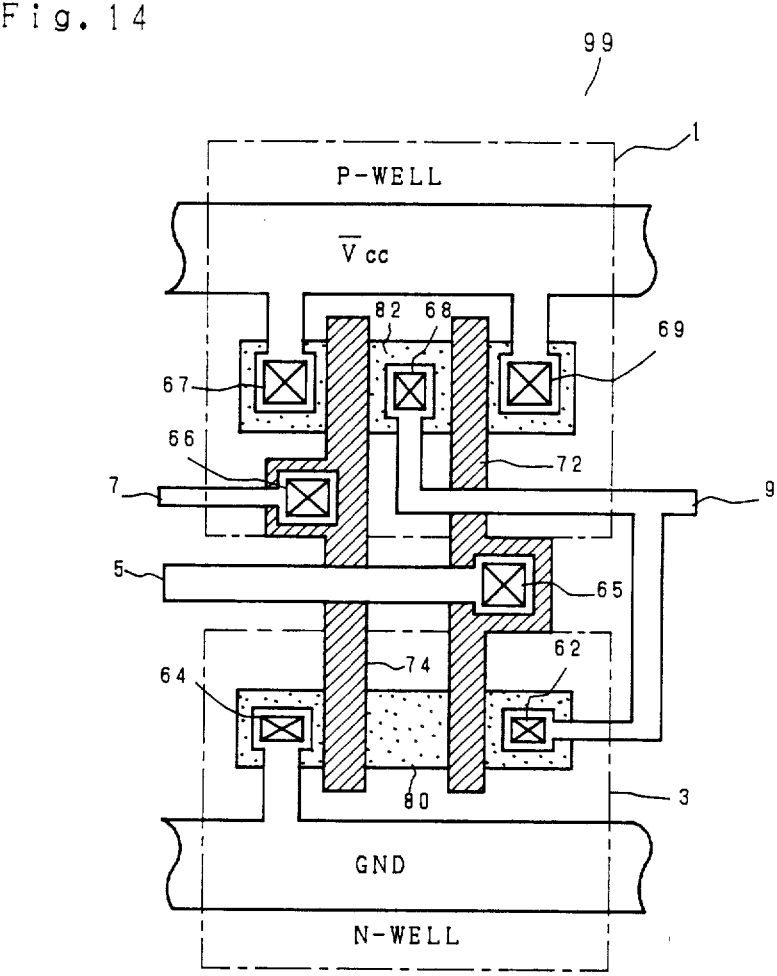
FIG. 14 is a cross-sectional view of a two input NAND gate used in a control circuit in accordance with the invention.

Refer now to FIG. 14. FIG. 14 is a cross-sectional view of a two input NAND gate 99 for use in accordance with the invention. The two input NAND gate 99 includes a p well 1 and an n well 3. Two inputs 5 and 7 are provided, along with an output 9. Also shown are control holes 64, 65, 66, 67, 68, and 69, disposed within diffusion areas 80 and 82 and the input and output areas 5, 7, and 9. Polysilicon gate areas 72 and 74 have inputs 5 and 7 disposed therein. As can be appreciated by one skilled in the art, the configuration of two input NAND gate 99 is very amenable to MOS fabrication and involves fewer fabrication steps, signal delays, components, and timing inputs than for a conventional D flip-flop. It should be understood that other two input NAND gates may be utilized within the scope of the invention and the embodiment in FIG. 14 is for illustration only.

Figure 4:
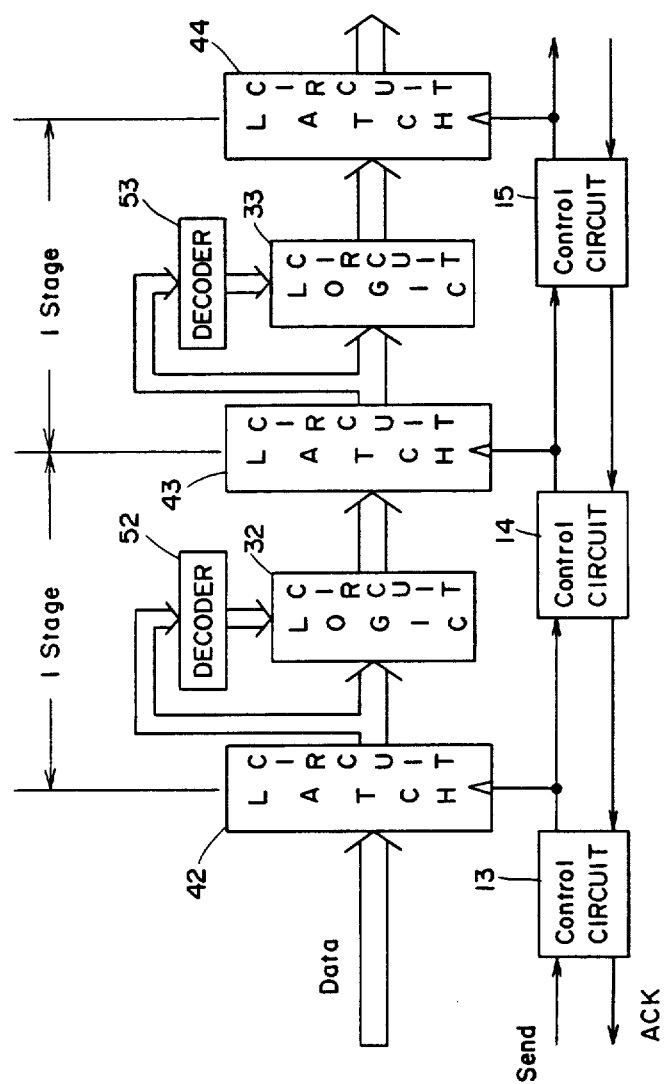
FIG. 4 is a schematic diagram showing data transfer and control circuits as used in a conventional pipelined processing system.

Because the data transfer signal of this invention is propagated under stable conditions as described above, without being affected by the pulse width of the initial send signal, it becomes possible to insert delay circuits intentionally into the propagation route of the send signal and the like. For a data transfer system as shown in FIG. 4, this characteristic is very effective to match the propagation time of the control signal and the time required for data processing when logic circuits for data processing are inserted between stages. The circuits of this invention are not only capable of applying to a conventional circuit such as the one shown in FIG. 1, but also have greater flexibility for optimizing the delay time between stages of the transfer request signals. For example, a delay circuit may be coupled directly in the path of an acknowledge signal $\overline{A1}$ which is taken directly from the output of receiving means R and is fed back to the preceding stage. The delay circuit may comprise a string of inverters or gating devices chosen for manufacturing considerations and delay objectives. An appropriate delay time would be chosen to match the transfer of the acknowledge signal with the processing time for that stage. Accordingly, the application of the invention to areas such as processor pipeline systems is shown to be advantageous.

As this invention may be embodied in several forms without departing from the spirit of essential characteristics thereof, the present embodiments are therefor illustrative only and not restrictive, since the scope of the invention is defined by the appended claims rather than by the description preceding them, and all changes that fall within the metes and bounds of the claims, or equivalence of such metes and bounds thereof are therefore intended to be embraced by the claims.

We claim:

1. A handshake type control circuit for controlling data transfer at a given stage in response to a send signal, said control circuit comprising:
    a circuit, responsive to said send signal and an acknowledge signal fed back from a succeeding stage, for activating a transfer control signal a first time to activate data transfer at said given stage when said send signal is activated and for inactivating said transfer control signal to inactivate data transfer at said given stage when said acknowledge signal is activated, said circuit prevented from activating said transfer control signal a second time to prevent recurring data transfer at said given stage until said send signal has been reset, whereby parasitic oscillation is prevented.

2. The control circuit of claim 1 wherein said circuit comprises a flip-flop having two two-input only NAND gates.

3. A method for controlling data transfer at a given stage in response to a send signal, comprising the steps of:
receiving said send signal at said given stage;
activating a transfer control signal a first time to activate data transfer at said given stage when said send signal is activated;
inactivating said transfer control signal to inactivate data transfer at said given stage when an acknowledge signal fed back to said given stage from a succeeding stage is activated; and
preventing said transfer control signal from being activated a second time to prevent recurring data transfer at said given stage until said send signal has been reset, whereby parasitic oscillation is prevented.

4. A handshake type control circuit for controlling data transfer at a given stage in response to a send signal, said control circuit comprising:
receiving means, responsive to at least four inputs including said send signal, a feedback signal, an acknowledge signal fed back from a succeeding stage, and a second control signal, for activating a first control signal when said send signal is activated and said feedback signal, said acknowledge signal, and said second control signal are inactivated and for inactivating said first control signal when said send signal is inactivated or when any one of said feedback signal, said acknowledge signal, and said second signal is activated;
a first circuit, responsive to said first control signal and said acknowledge signal, for activating a transfer control signal to activate data transfer at said given stage and said feedback signal when said first control signal is activated and for inactivating said transfer control signal to inactive data transfer at said given stage when said acknowledge signal is activated; and
a second circuit, responsive to said first control signal and said send signal, for activating said second control signal when said first control signal is activated and for inactivating said second control signal when said send signal is inactivated so that said transfer control signal can be activated only once each time said send signal is activated and parasitic oscillation is prevented.

5. The control circuit of claim 4 wherein said receiving means comprises a NAND gate.

6. The control circuit of claim 4 wherein said first circuit comprises a flip-flop.

7. The control circuit of claim 4 wherein said second circuit comprises a flip-flop.

8. The control circuit of claim 4 wherein said first and second circuits each comprises two two-input only NAND gates.

9. The control circuit of claim 4 wherein said receiving means, said first circuit, and said second circuit include NAND gates each of which has only two input terminals.

10. The control circuit of claim 4 wherein said control circuit is a MOS type circuit.

11. The control circuit of claim 4 wherein said acknowledge signal is activated after processing at said succeeding stage has been completed.

12. The control circuit of claim 4 wherein said acknowledge signal is activated after said send signal is received at said succeeding stage.

13. The control circuit of claim 4 wherein said second circuit is disposed outside a communication path between said given stage and said succeeding stage.

14. A handshake type data transfer system for transferring data in response to a data transfer request signal, comprising:
a plurality of consecutive pipelined transfer stages, each having a data transfer circuit and a corresponding control circuit, said stages communicating over a send line and an acknowledge line;
a given stage having at least one said control circuit which includes:
receiving means, responsive to at least four inputs including a send signal, a feedbak signal, an acknowledge signal fed back from a succeeding stage, and a second control signal, for activating a first control signal when said send signal is activated and said feedback signal, said acknowledge signal, and said second control signal are inactivated and for inactivating said first control signal when said send signal is inactivated or when any one of said feedback signal, said acknowledge signal, and said second control signal is activated,
a first circuit, responsive to said first control signal and said acknowledge signal, for activating a transfer control signal to activate data transfer at said given stage and said feedback signal when said first control signal is activated and for inactivating said transfer control signal to inactivate data transfer at said given stage when said acknowledge signal is activated, and
a second circuit, responsive to said first control signal and said send signal, for activating said second control signal when said first control signal is activated and for inactivating said second control signal when said send signal is inactivated so that said transfer control signal can be activated only once in response to each activated send signal and parasitic oscillation is prevented,
wherein said acknowledge signal received at said given stage is said second control signal produced by said succeeding stage and said send signal received at said succeeding stage is provided by said control circuit of said given stage; and
said data transfer request signal being said send signal received at an initial stage of said stages.

15. The transfer system of claim 14 wherein at least one said data transfer circuit comprises a latch circuit.

16. The transfer system of claim 14 wherein at least one said data transfer circuit is coupled to means for processing data.

17. The transfer system of claim 14 wherein said acknowledge signal is activated after processing at said succeeding stage has been completed.

18. The transfer system of claim 14 wherein said second control signal is provided as an acknowledge signal by said given stage to a preceding stage.

19. The transfer system of claim 14 wherein said given stage further includes means, coupled to said control circuit, for delaying the transfer of said send signal from said given stage to said succeeding stage for a predetermined time.

20. A handshake type pipelined data processing system for transferring data in response to a data transfer request signal, said data processing system having a plurality of consecutive stages including a given stage which comprises:
  a processor;
  a data transfer circuit for transferring data to said processor;
  a control circuit for controlling data transfer at said given stage in response to a send signal, said control circuit comprising:
  receiving means, responsive to at least four inputs including said send signal, a feedback signal, an acknowledge signal fed back from a succeeding stage, and a second control signal, for activating a first control signal when said send signal is activated and said feedback signal, said acknowledge signal, and said second control signal are inactivated and for inactivating said first control signal when said send signal in inactivated or when any one of said feedback signal, said acknowledge signal, and said second control signal is activated,
  a first circuit, responsive to said first control signal and said acknowledge signal, for activating a transfer control signal to activate data transfer at said given stage and said feedback signal when said first control signal is activated and for inactivating said transfer control signal to inactivate data transfer at said given when said acknowledge signal is activated, and
  a second circuit, responsive to said first control signal and said send signal, for activating a second control signal when said first control signal is activated and for inactivating said second control signal when said send signal is inactivated so that said transfer control signal can be activated only once in response to each activated send signal and parasitic oscillation is prevented,
  wherein said acknowledge signal received at said given stage is said second control signal produced by said succeeding stage and said send signal received at said succeeding stage is provided by said control circuit of said given stage; and
  said data transfer request signal being said send signal received at an initial stage of said stages.

21. A handshake type pipelined data processing system having a plurality of consecutive stages for transferring data in response to a data transfer request signal, a given stage including a data transfer circuit and a control circuit coupled thereto for controlling data transfer in response to a send signal, said control circuit comprising:
  a NAND gate having a first input for receiving said send signal, a second input for receiving a feedback signal, a third input for receiving an acknowledge signal fed back from a succeeding stage, and a fourth input for receiving a second control signal, said NAND gate activating a first control signal at the output when said send signal is activated and said feedback signal, said acknowledge signal, and said second control signal are inactivated, said NAND gate inactivating said first control signal at the output when said send signal is inactivated or when any one of said feedback signal, said acknowledge signal, and said second control signal is activated;
  a first flip-flop having a first input coupled to the output of said NAND gate and a second input for receiving said acknowledge signal, said first flip-flop activating a transfer control signal to activate data transfer through said data transfer circuit and said feedback signal when said first control signal is activated, said first flip-flop inactivating said transfer control signal to inactive data transfer through said data transfer circuit when said acknowledge signal is activated; and
  a second flip-flop having a first input coupled to the output of said NAND gate and a second input for receiving said send signal, said second flip-flop activating said second control signal when said first control signal is activated, said second flip-flop inactivating said second control signal when said send signal is inactivated so that said transfer control signal can be activated only once for each received activated send signal and parasitic oscillation is prevented;
  wherein said acknowledge signal received at said given stage is said second control signal produced by said succeeding stage and said send signal received at said succeeding stage is provided by said control circuit of said given stage; and
  said data transfer request signal being said signal received at an initial stage of said stages.

22. A handshake type control circuit for controlling data unlatching and latching at a given stage in response to a send signal, said control circuit comprising:
  means, responsive to said send signal, for setting a latch control signal a first time when said send signal is set and for resetting said latch control signal in response to said send signal received at a succeeding stage; and
  means, responsive to said send signal, for preventing said means for setting and resetting from setting said latch control signal a second time until said send signal has been reset, whereby parasitic oscillation is prevented.

23. A handshake type data latch system for controlling data unlatching and latching in response to a send signal, comprising:
  a first and a second stage coupled to one another, each stage having a data latch circuit controlled by a latch control signal pair including a first latch control signal and a second latch control signal which is the complement of said first latch control signal and a corresponding control circuit coupled to said data latch circuit for setting and resetting said first latch control signal;
  said control circuit including:
  receiving means, responsive to at least four inputs including said send signal, a feedback signal, an acknowledge signal, and a second control signal, for resetting a first control signal when all of said four inputs are set and for setting said first control signal when any one of said four inputs is reset,
  a first circuit, responsive to said first control signal and said acknowledge signal, for setting said first latch control signal and resetting said feedback signal when said first control signal is reset and for resetting said first latch control signal when said acknowledge signal is reset, and
  a second circuit, responsive to said first control signal and said send signal, for resetting said second control signal when said first control signal is reset and for setting said second control signal when said send signal is reset so that said first latch control signal can be set only once in response to each set send signal and parasitic oscillation is prevented;

said acknowledge signal received at said first stage being said second control signal produced by said second stage; and said send signal received at said second stage provided by said control circuit of said first stage.

24. The handshake type data latch system of claim 23 wherein said send signal received at said second stage is said first latch control signal.

25. The handshake type data latch system of claim 23 wherein said first circuit means of said control circuit of said first stage provides a third control signal as said send signal received at said second stage, the complement of said third control signal provided as said second latch control signal.

* * * * *